US006879596B1

(12) United States Patent
Dooply

(10) Patent No.: US 6,879,596 B1
(45) Date of Patent: Apr. 12, 2005

(54) SYSTEM AND METHOD FOR SYSTOLIC ARRAY SORTING OF INFORMATION SEGMENTS

(75) Inventor: Ayoob Eusoof Dooply, La Jolla, CA (US)

(73) Assignee: Applied Micro Circuits Corporation, San Diego, CA (US)

( * ) Notice: Subject to any disclaimer, the term of this patent is extended or adjusted under 35 U.S.C. 154(b) by 875 days.

(21) Appl. No.: 09/832,784

(22) Filed: Apr. 11, 2001

(51) Int. Cl.[7] .......................... H04L 12/28; H04L 12/56
(52) U.S. Cl. ...................... 370/412; 370/389
(58) Field of Search .................... 370/412, 415, 370/416, 417, 418, 419, 420, 413, 421, 447, 414, 429, 230.1, 235, 235.1, 236, 233, 229, 230, 395.1, 395.4, 461, 462, 389, 473, 395.2

(56) References Cited

U.S. PATENT DOCUMENTS

| | | | |
|---|---|---|---|
| 5,463,777 A | 10/1995 | Bialkowski et al. | |
| 5,485,474 A | 1/1996 | Rabin | |
| 5,574,910 A | 11/1996 | Bialkowski et al. | |
| 5,608,662 A | 3/1997 | Large et al. | |
| 5,848,233 A | 12/1998 | Radia et al. | |
| 5,987,622 A | 11/1999 | Lo Verso et al. | |
| 6,061,679 A | 5/2000 | Bournas et al. | |
| 6,728,270 B1 * | 4/2004 | Meggers et al. | ............ 370/514 |
| 6,791,992 B1 * | 9/2004 | Yun et al. | ................... 370/415 |

* cited by examiner

Primary Examiner—Wellington Chin
Assistant Examiner—Jamal A. Fox
(74) Attorney, Agent, or Firm—INCAPLAW; Terrance A. Meador

(57) ABSTRACT

A system and method have been provided for sorting information segments in a packet/cell earliest deadline first queue circuit. The invention permits information segments to be inserted at a rate that is twice as fast as the maximum extraction rate. Pairs of permanent and temporary registers are organized into a hierarchical sequence of stages. Generally, information segments with lower field ranks move systolically through the stages to temporary registers in higher sequence stages. Information segments with higher field ranks move systolically through the stages to permanent registers lower in the sequence of stages. The invention permits the highest rank information segments to be sorted and extracted with great efficiency.

43 Claims, 10 Drawing Sheets

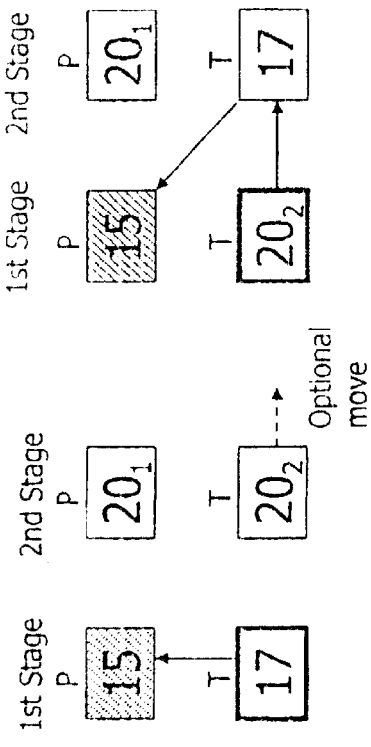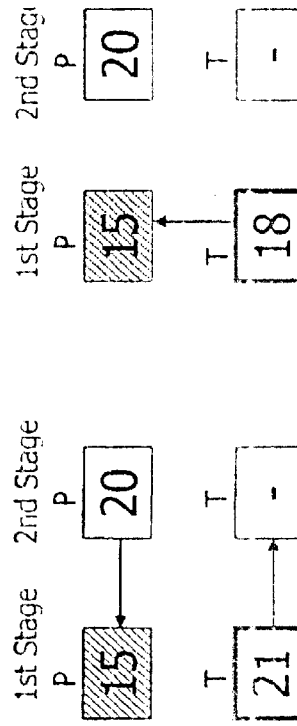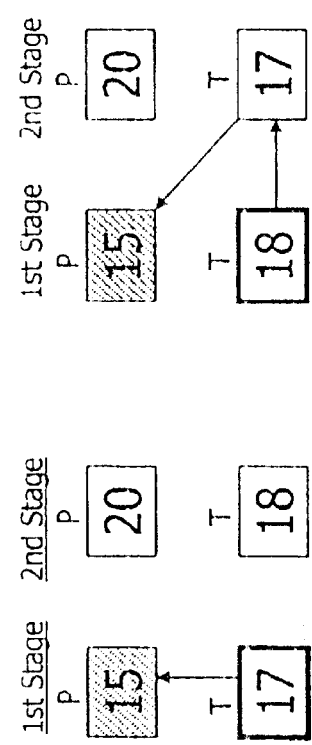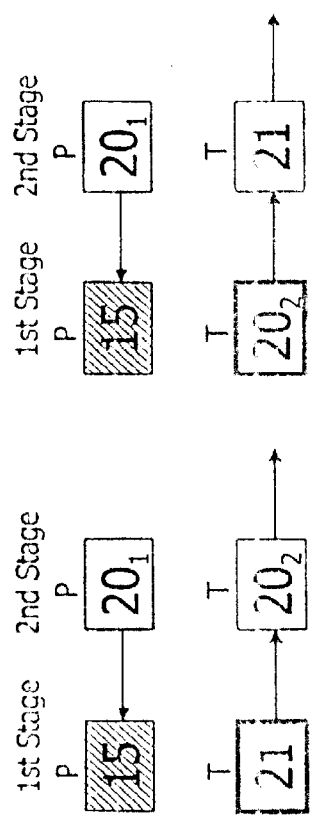

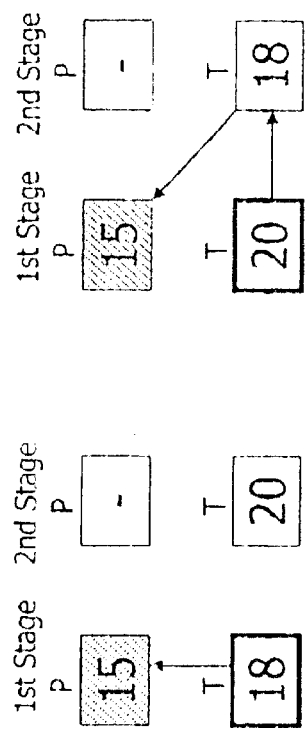
FIG. 12
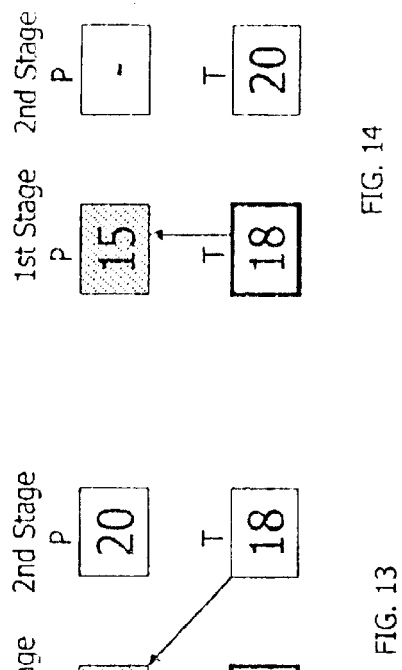
FIG. 13
FIG. 14
FIG. 15
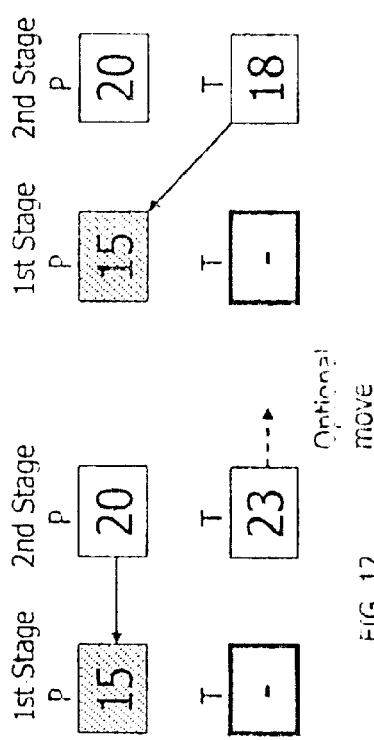
FIG. 15
FIG. 17
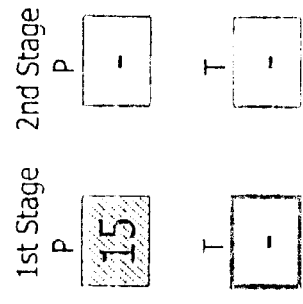
FIG. 16
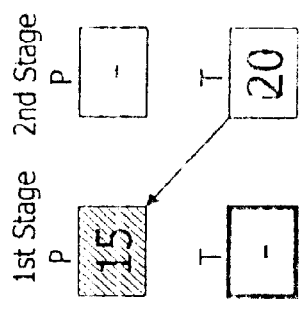
FIG. 18

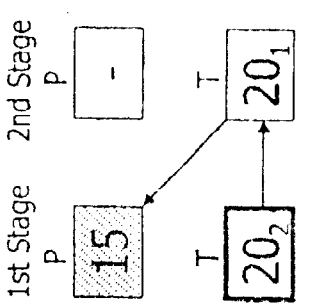
FIG. 20
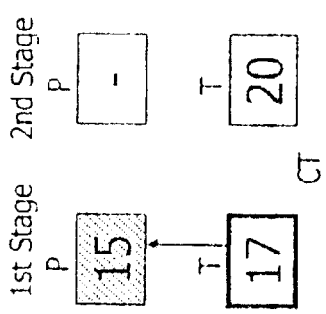
FIG. 21
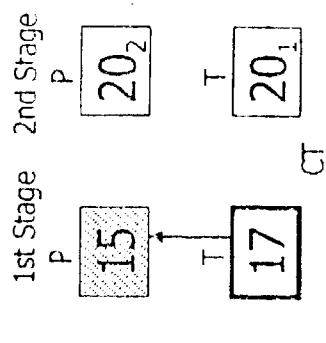
FIG. 22
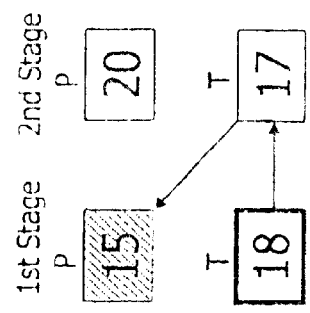
FIG. 23
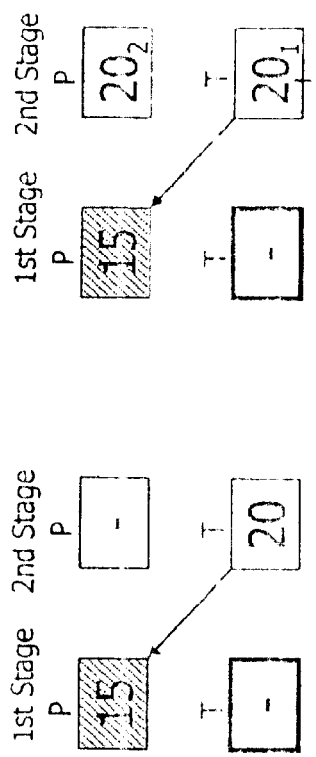
FIG. 24
FIG. 25
FIG. 26

SYSTEM AND METHOD FOR SYSTOLIC ARRAY SORTING OF INFORMATION SEGMENTS

BACKGROUND OF THE INVENTION

1. Field of the Invention

This invention relates generally to the transfer of information segments across a broadband switch and, more particularly, to a system and method for sorting information segments in a earliest deadline first (EDF) queue based upon information segment field rankings.

2. Description of the Related Art

As noted in U.S. Pat. No. 5,608,662 (Large et al.), there are various situations and various types of communication signal paths in which it would be desirable to enable a selection of data to be processed and to cause other data to be ignored or perhaps processed differently. One example is a broadcast data network, i.e., a network wherein data are transmitted generally to a number of subscriber stations. The data are subdivided into data set groupings, such as a number of consecutive bytes typically including leading and/or trailing marker or information bytes or the like, which groupings are termed "packets."

A packet is a sequence of bytes delivered by the communication line that are rendered distinct from other sequences of bytes, according to a protocol applied when the bytes are encoded and decoded. Packet techniques are well known and include, for example, the EtherNet protocol (IEEE standard 802.3) and commercial packet protocols such as the Synchronous Data Link protocol (SDLC) and X.25. An external circuit monitors the incoming communication line and determines when the packet begins. Bytes of the packet are then processed until packet reception is complete.

Commercially available circuits and interfaces are known for performing the tasks of recognizing the beginning of a packet and processing bytes until complete, for example as known from a byte count, end marker or the like. The generic function of receiving packets is thus known. However, once a packet or sequence of bytes is extracted from the communication network, there are a variety of possibilities as to how the encoded data are to be processed.

The quickest method of sorting information segments is to use a "broadcast"-based sorting method. In this method, an insert or an extract operation can be communicated to every register in the queue simultaneously. Information segments can likewise be inserted or extracted, from register to register, in a single operation. However, the broadcast sorting method has difficulties associated with it. A hardwire connection must be made to each stage. This makes for hardware design problems and associated long interconnect delay. Further, it is difficult to expand or scale such a design because global interconnects do not scale well especially as the technology shrinks to smaller feature sizes.

On the other hand, a systolic array relies upon communications between neighboring stage registers to insert or extract information segments. Thus, the design is flexible and can be scaled. However, the more limited stage-to-stage communication requires relaying information segments stage-to-stage. For example, extraction is done in two steps: One step to extract an information segment from a stage and one step to fill the empty stage from a neighboring stage so that a next extraction can be done.

It would be advantageous if a system existed for more efficiently handling information segments in a systolic array.

It would be advantageous if the stages in a systolic array worked as teams to speed the sorting process.

It would be advantageous if a systolic array sorting system could operate at a higher processing rate. Specifically, it would be advantageous if information to be sorted could be inserted at twice the rate at which it is extracted.

SUMMARY OF THE INVENTION

Accordingly, a method is provided for sorting information segments by field rank in a broadband earliest deadline first queue. The method comprises: inserting information segments, having a field with a sequential rank, at a maximum insertion rate into a temporary register; pairing a temporary register with a corresponding permanent register having the same order in sequence of neighboring registers, forming stages in a sequenced order of stages; systolically moving information segments with lower field ranks to registers higher in a sequenced order of registers; systolically moving information segments with higher field ranks to registers lower in a sequenced order of registers; extracting the information segments, by field rank, at a maximum extraction rate where the maximum insertion rate is equal to twice the maximum extraction rate.

Following the insertion of an information segment into a temporary register in a first stage, the method comprises: comparing the field rank of the information segment in the temporary register to the field rank of an information segment in the first stage permanent register; inserting the information segment having the lower rank into the temporary register of a second stage, higher in order than the first stage; and, moving the information segment having the higher rank into the first stage permanent register.

Following the extraction of an information segment from a register in a first stage, the method comprises: forming a cooperative relationship between the first stage and a second stage, higher in sequence then the first stage; comparing the field ranks of information segments in the cooperating first and second stages; and, following the comparison, moving the information segment with the highest ranking to the permanent register in the first stage.

Additional details of the systolic array sorting method, and a earliest deadline first queue sorting system are described below.

BRIEF DESCRIPTION OF THE DRAWING

FIGS. 4 through 26 illustrate examples of the information segment extraction operations mentioned above in the description of FIGS. 1 and 3.

DETAILED DESCRIPTION OF THE PREFERRED EMBODIMENTS

Figure 1:
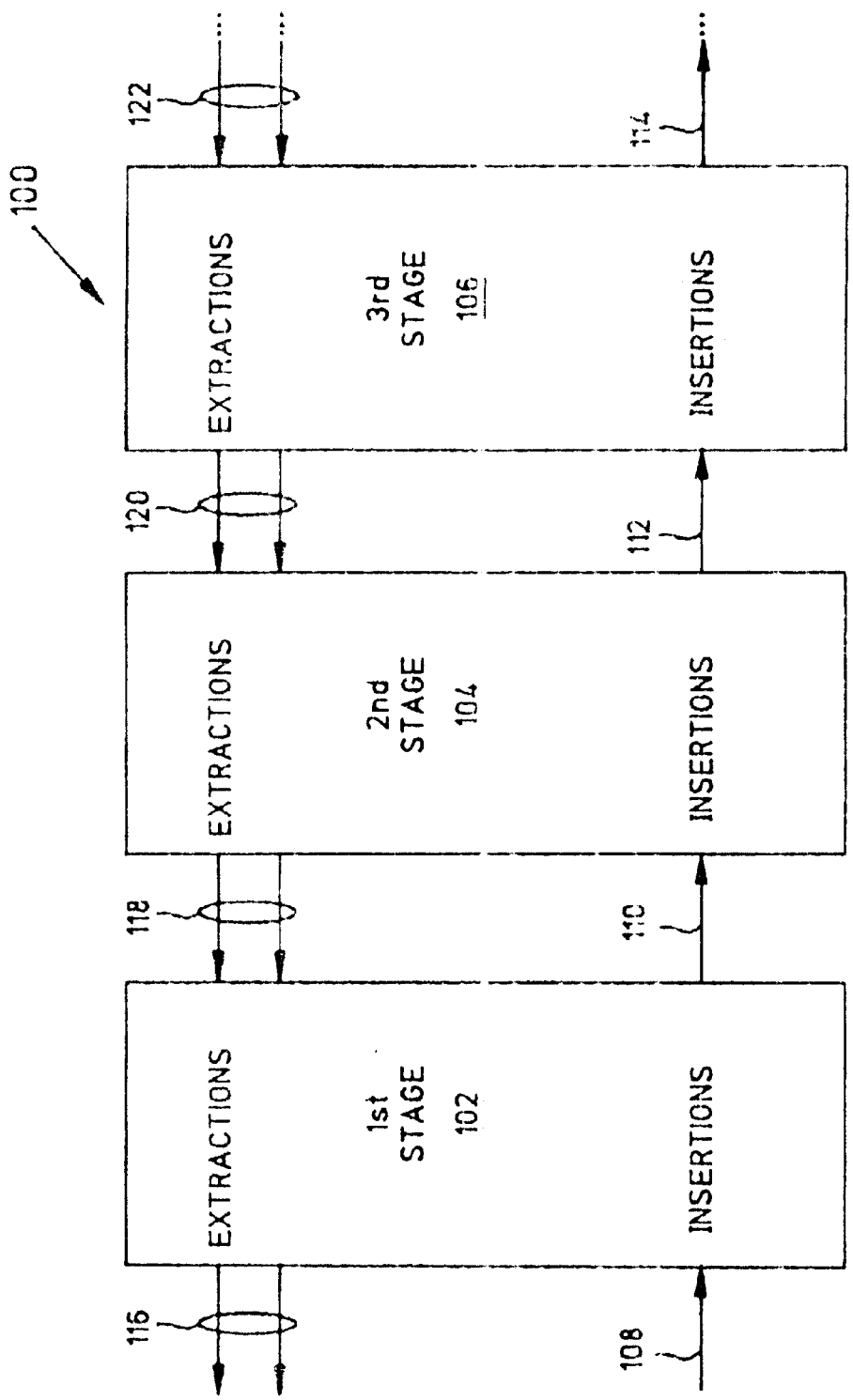
FIG. 1 is a schematic block diagram illustrating a earliest deadline first queue system for sorting information segments by field rank.

FIG. 1 is a schematic block diagram illustrating a earliest deadline first queue system for sorting information segments by field rank. The system 100 may operate with a scheduler (not shown), co-located on the same IC with the EDF queue, or on a cooperating IC which supplies the information segment deadlines (ranks). The system 100 comprises a sequence of stages for storing information segments having a field of sequential ranks. A sequence of three stages, a first stage 102, a second stage 104, and a third stage 106 are shown, but the invention is not limited to any particular number of stages. The information segment can be a packet, or section of a packet. In other aspects of the invention, the information segment includes an address or tag that specifies the location of a packet in memory and the packet's deadline.

Each stage has a port for accepting information segment insertions from a lower sequence stage. As shown, first stage 102 has a port on line 108 to accept an information segment insertion from either a lower sequence stage (not shown), or from the input of the system 100 when the first stage 102 is the lowest sequence stage. Line 110 inserts information segments from the first stage 102 to the second stage 104. Line 112 inserts information segments from the second stage 104 to the third stage 106, and line 114 inserts information segments to a higher sequence stage (not shown), if any.

Each stage includes a port for supplying extracted information segments to a lower sequence stage. As shown, first stage 102 has a port on line 116, depicted as two separate lines, for supplying extracted information segments. The second stage 104 has a port on line 118 to supply extracted information segments. The third stage 106 has a port on line 120 to supply extracted information segments.

Each stage includes a port for accepting extracted information segments from a higher sequence stage. As shown, first stage 102 has a port connected to line 118, depicted as two separate lines, to accept extracted information segments. The second stage 104 has a port on line 120 to accept extracted information segments. The third stage 106 has a port on line 122 to accept extracted information segments from a higher sequence stage (not shown), if any.

Each stage also includes a port for supplying information segment insertions to a higher sequence stage. As shown, the first stage 102 supplies information segments for insertion on line 110. The second stage 104 supplies information segments for insertion on line 112, and the third stage 106 supplies information segments for insertion to a higher sequence stage (not shown) on line 114, if any.

Figure 2:
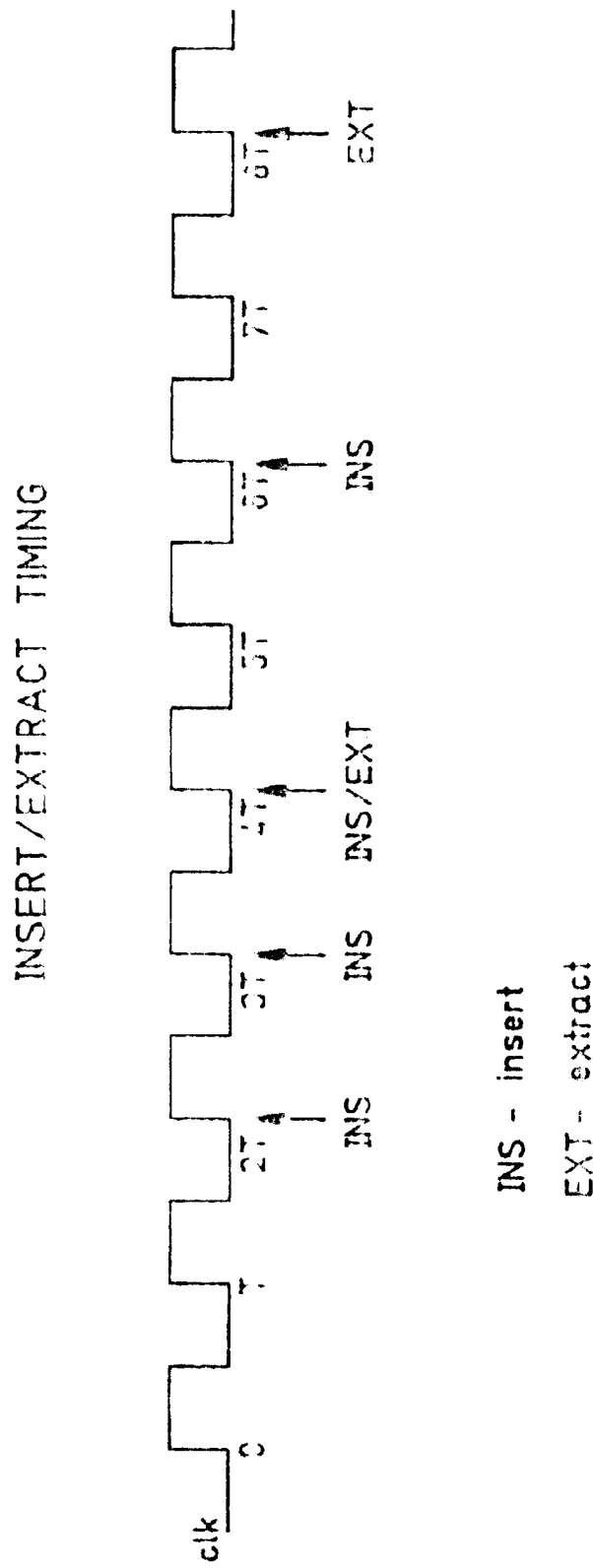
FIG. 2 is a diagram illustrating the timing relationship between the insertion and extraction operations.

FIG. 2 is a diagram illustrating the timing relationship between the insertion and extraction operations. Each stage accepts information segments inserted at a maximum insertion rate, and supplies information segments extracted at a maximum extraction rate, where the maximum insertion rate is equal to twice the maximum extraction rate. As explained in more detail below, the extraction process is responsive to the field rank of the information segments. As shown in FIG. 2, there is no fixed relationship between the insertions and the extractions. The insertion operation can occur at a maximum rate of once per clock cycle, but an insertion need not occur every cycle. Neither is there a fixed timing relationship between insertion operations. Likewise, the maximum extraction rate is once per two clock cycles, but again, an extraction need not occur every two cycles. Two consecutive extraction operations must be at least two clock cycles apart.

Figure 3:
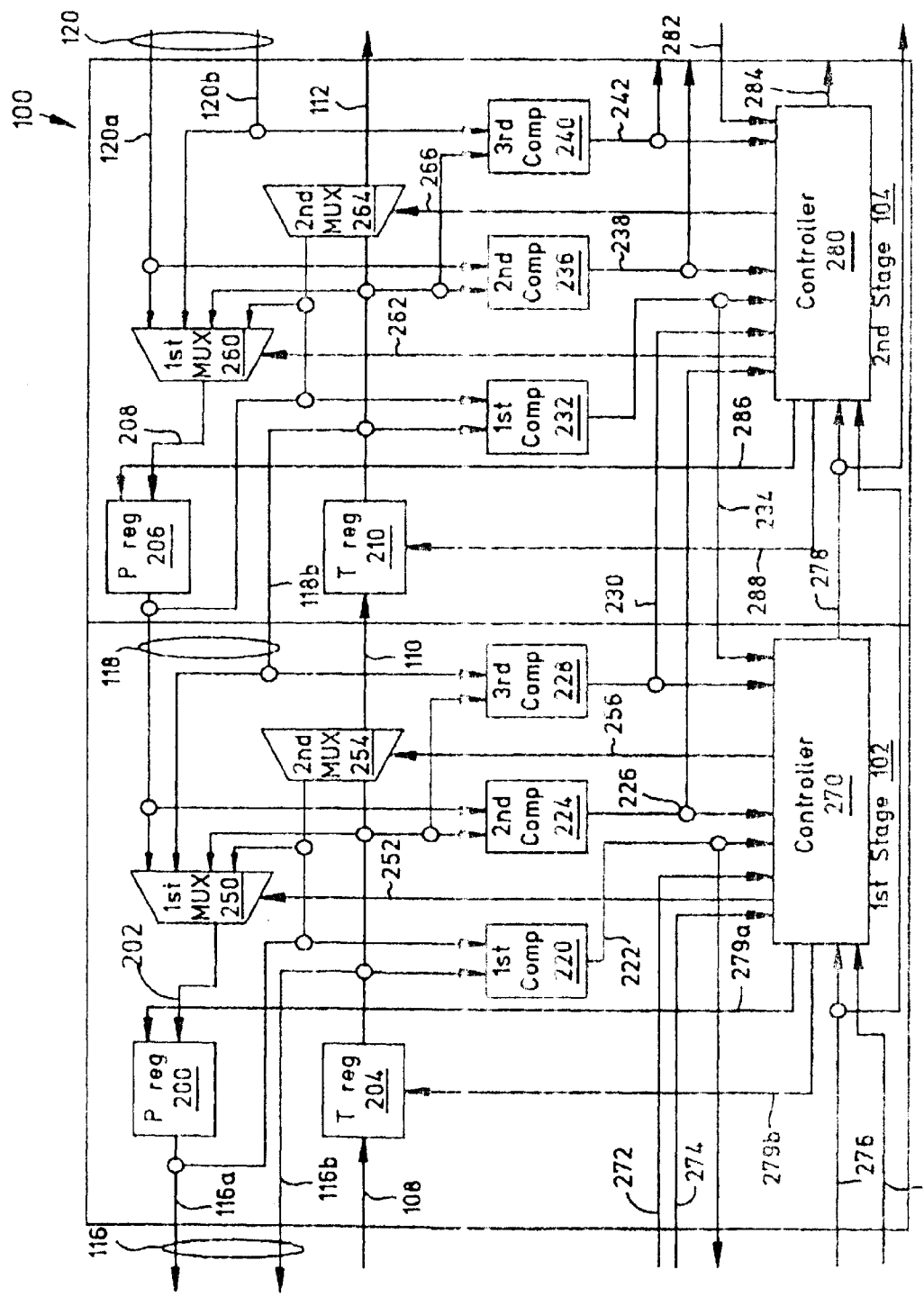
FIG. 3 is a schematic block diagram illustrating the first stage and the second stage of FIG. 1 in greater detail.

FIG. 3 is a schematic block diagram illustrating the first stage 102 and the second stage 104 of FIG. 1 in greater detail. Each stage includes a temporary register having an input and an output, and a permanent register having an input and an output. As shown, the first stage 102 has a permanent register 200 (P Reg) with an input on line 202 and an output on line 116a. A temporary register 204 (T Reg) has an input on line 108 and an output on line 116b. Likewise, the second stage 104 has a permanent register 206 with an input on line 208 and an output on line 118a. A temporary register 210 has an input on line 110 and an output on line 118b.

The insertion process is relatively simple. A lower sequence stage inserts information segments into the temporary register of a higher sequence stage. For example, either the temporary register 204 or the permanent register 200 in the first stage 102 can insert information segments into the temporary register 210 of the second stage 104.

The extraction process typically entails a permanent register in a lower sequence stage receiving information segments extracted from a permanent register in a higher sequence stage. For example, the permanent register 200 in the first stage 102 can extract an information segment from the permanent register 206 in the second stage 104.

Each stage further includes a first, second, and third comparator. For example, in the first stage 102 a first comparator 220 has a first input connected to the temporary register output on line 116b, a second input connected to the output of the permanent register on line 116a, and an output on line 222 to supply the results of a comparison of information segment field ranks. A second comparator 224 has a first input connected to the temporary register output on line 116b, a second input connected to the output of a permanent register in a higher sequence stage on line 118a, and an output on line 226 to supply the results of a comparison of information segment field ranks. A third comparator 228 has a first input connected to the temporary register output on line 116b, a second input connected to the output of a temporary register in a higher sequence stage on line 118b, and an output on line 230 to supply the results of a comparison of information segment field ranks.

Alternately, each stage could be operated with only two comparators and an additional MUX to selectively supply two sets of the comparator inputs. As seen in the examples below, the first and second comparator are never used at the same time. However, the use of a three comparators, and eliminating the additional MUX, speeds the processing time.

Likewise, in the second stage 104 a first comparator 232 has a first input connected to the temporary register output on line 118b, a second input connected to the output of the permanent register on line 118a, and an output on line 234 to supply the results of a comparison of information segment field ranks. A second comparator 236 has a first input connected to the temporary register output on line 118b, a second input connected to the output of a permanent register in a higher sequence stage on line 120a, and an output on line 238 to supply the results of a comparison of information segment field ranks. A third comparator 240 has a first input connected to the temporary register output on line 118b, a second input connected to the output of a temporary register in a higher sequence stage on line 120b, and an output on line 242 to supply the results of a comparison of information segment field ranks.

Each stage further includes a first multiplexor (MUX) and a second MUX. The first stage 102 has a first MUX 250 with a first input connected to the output of the permanent register in the higher sequence stage on line 118a, a second input connected to the temporary register in the higher sequence stage on line 118b, a third input connected to the output of the temporary register in the same stage on line 116b, a fourth input connected to the output of the permanent register in the same stage on line 116a, an output connected to the input of the permanent register in the same stage on line 202, and a control input on line 252 to accept MUX selection commands.

A second stage second MUX 254 has a first input connected to the output of the permanent register in the same stage on line 116a, a second input connected to the output of the temporary register in the same stage on line 116b, an output connected to the input of the higher sequence stage temporary register input on line 110, and a control input to accept MUX selection commands on line 256.

Likewise, the second stage 104 has a first MUX 260 with a first input connected to the output of the permanent register in the higher sequence stage on line 120a, a second input connected to the temporary register in the higher sequence stage on line 120b, a third input connected to the output of the temporary register in the same stage on line 118b, a fourth input connected to the output of the permanent register in the same stage on line 118a, an output connected to the input of the permanent register in the same stage on line 208, and a control input on line 262 to accept MUX selection commands.

A second MUX 264 has a first input connected to the output of the permanent register in the same stage on line 118a, a second input connected to the output of the temporary register in the same stage on line 118b, an output connected to the input of the higher sequence stage temporary register input on line 112, and a control input to accept MUX selection commands on line 266.

Each stage also includes a controller. In the first stage 102, a controller 270 has a first input connected to the output of the first comparator on line 222, a second input connected to the output of the second comparator on line 226, a third input connected to the output of the third comparator on line 230, a fourth input to connected to the output of a second comparator in a lower sequence stage on line 274, a fifth input connected to the output of a third comparator in a lower sequence stage on line 272, a sixth input connected to the output of a first comparator in a higher sequence stage on line 234, a seventh input to accept insertion and extraction commands from a controller in a lower sequence stage on line 276. If the first stage 102 is the lowest sequence stage, then the seventh input of the controller 270 receives instructions from an elements external to the system 100. An eighth input connected to the seventh input of a controller in a lower sequence stage on line 277 to further cooperation between the controllers, a first output connected to the control input of the first MUX on line 252, a second output connected to the control input of the second MUX on line 256, and a third output connected to the seventh input of a controller in a higher sequence stage on line 278.

The controller 270 has a fourth output on line 279a connected to the permanent register 200. The controller 270 erases data in permanent register 200 with commands on line 279a. The controller 270 has a fifth output on line 279b connected to the temporary register 204. The controller 270 holds the current information segment residing in temporary register with commands on line 279b.

Likewise, the second stage 104 has a controller 280 with a first input connected to the output of the first comparator on line 234, a second input connected to the output of the second comparator on line 238, a third input connected to the output of the third comparator on line 242, a fourth input connected to the output of a second comparator in a lower sequence stage on line 226, a fifth input connected to the output of a third comparator in a lower sequence stage on line 230, a sixth input connected to the output of a first comparator in a higher sequence stage on line 282, a seventh input to accept insertion and extraction commands from a controller in a lower sequence stage on line 278. The controller 280 has an eighth input connected to the seventh input of a controller in a lower sequence stage on line 276 to further cooperation between the controllers, a first output connected to the control input of the first MUX on line 262, a second output connected to the control input of the second MUX on line 266, and a third output connected to the seventh input of a controller in a higher sequence stage on line 284. The controller 280 has fourth and fifth outputs on lines 286 and 288, connected to the permanent register 206 and the temporary register 210, respectively. Commands on these lines hold or erase the information segments in the registers as mentioned above in the description of the first stage 102.

The controllers in the sequence of stages, for example controllers 270 and 280, interact to systolically move information segments with lower field ranks from stages lower in a sequence, to stages higher in sequence (insertion). The controllers in the sequence of stages also cooperate as a team to systolically move information segments with higher field ranks, from higher sequence stages, to lower sequence stages (extraction).

A stage receives an information segment and a corresponding command message from a lower sequence stage. More specifically, the temporary register of a stage receives an information segment and the controller of a stage receives a command message from a lower sequence stage. For example, the temporary register 210 and the controller 280 of stage 104 receive an information segment and a corresponding command message respectively from the stage 102. A controller also receives comparator results from neighboring stages as well as its own stage. Then, the controller sets the MUXs for appropriate action to move data among neighboring registers. The controller then sends a command message to the controller in the next higher sequence stage to accompany a data movement. In an extraction operation, the higher sequence stage needs to know if the lower sequence stage is having an information segment extracted from permanent register of the lower sequence stage. In an extraction operation the two registers cooperate to fill the "hole" in the lower stage permanent register. Note that the flow of command message is always from a lower sequence stage (controller) to a higher sequence stage (controller). When moving an information segment from a lower sequence stage to a neighboring higher sequence stage, an information segment from either the permanent or the temporary register of the lower sequence stage can be moved only to the temporary register of the higher sequence stage. On the other hand, moving an information segment from a higher sequence stage to a neighboring lower sequence stage is limited to moving an information segment from either the permanent or the temporary register of the higher sequence stage to the permanent register of the lower sequence stage.

The command message from a lower sequence stage to a higher sequence stage can be one of the following five commands: "idle" when no information segment is moved between a lower sequence stage and a higher sequence stage; "insert" when an information segment is moved from the temporary register of a lower sequence stage to the temporary register of the higher sequence stage; "shift" when an information segment is moved from the permanent register of a lower sequence stage to the temporary register of the higher sequence stage; "extract" when an information segment is moved from the permanent register of a higher sequence stage to the permanent register of the lower sequence stage; "insert and extract" when an information segment is moved from the permanent register of the higher sequence stage to the permanent register of the lower sequence stage while an information segment from the temporary register of the lower sequence stage to the temporary register of the higher sequence stage is moved at the same time.

An information segment is said to be "ordered" when it is placed in a permanent register of a stage. Comparisons are done such that information segments with same field ranks are ordered based on their arrival time. A "shift" operation is used to preserve the right ordering of information segments when moving them from lower sequence stages to higher sequence stages. In a "shift" operation, no comparisons are required as opposed to an "insert" operation. A "shift" operation causes information segments in permanent registers to be shifted from lower sequence registers to higher sequence registers without any comparisons.

When the temporary register of a first stage receives a shift command from a stage lower in the sequence of stages, and an information segment having the same rank as the information segment in the first stage permanent register, the information segment in the first stage permanent register is shifted to a temporary register in a second stage, higher in the sequence of stages than the first stage.

With the elements of the stages depicted, the insertion operation can be described with greater specificity. When an information segment is inserted into the temporary register 204 in the first stage 102, for example, the first comparator 220 compares the ranks of the information segment inserted into the temporary register 204 and the information segment in the permanent register 200. The first comparator 220 supplies the results of the comparison to the controller 270 on line 222. Then, the controller 270 directs the first MUX 250 to supply the information segment with the higher rank to the permanent register 200. The controller 270 also directs the second MUX 254 to supply the information segment with the lower rank to the temporary register 210 of the second stage 104, that is higher in sequence than the first stage 102. The first stage prepares the second stage 104 for the insertion with communication from the first stage controller 270 to the second stage controller 280 through line 278. An insertion operation can "ripple" through to a next stage, if the second stage must empty its temporary register to accept the insertion from the first stage.

When an information segment is extracted, from the first stage permanent register 200 for example, the first stage second comparator 224 compares the rank of the information segment in the first stage temporary register 204 to an information segment in the second stage permanent register 206. The first stage third comparator 228 compares the rank of the information segment in the first stage temporary register 204 to the information segment in a second stage temporary register 210. The second stage first comparator 232 compares the rank of the information segment in the second stage temporary register 210 to the information segment in the second stage permanent register 206. The first stage controller 270, connected to receive the results of the three comparison operations, is then able to control the MUXs to supply the information segment with highest rank to the first stage permanent register 200. The output of a comparator is disregarded if that comparator is comparing one or more registers having no information segment.

The first stage controller 270 sends a message to the second stage controller on line 278 to communicate the extraction operation. The first stage controller 270 directs the first stage first MUX 250 to deliver the highest ranking information segment to the first stage permanent register 200. If the first stage temporary register 204 information segment is not the highest ranked, the first stage controller 270 directs the first stage second MUX 254 to insert that information segment into the second stage temporary register 210.

If the second stage permanent register 206 information segment is not the highest ranked, the second stage controller 280 maintains that information segment in the second stage permanent register 206. If the second stage permanent register 206 information segment is extracted and moved to the first stage permanent register 200, a new extraction operation is begun with the second stage 104 cooperating with the third stage 106 (see FIG. 1). An extraction operation can "ripple" through the sequence of stages if "holes" are created in the permanent register. The second stage second comparator 236 compares the rank of the information segment in the second stage temporary register 210 to an information segment in a third stage permanent register (not shown), where the third stage 106 is higher in sequence than the second stage 104. The second stage third comparator 240 compares the rank of the information segment in the second stage temporary register 210 to the information segment in a third stage temporary register (not shown). The third stage first comparator (not shown) compares the rank of the information segment in the third stage temporary register (not shown) to the information segment in the third stage permanent register (not shown).

A first/second stage extraction operation can also result in the insertion of information segments from the first stage 102 to the second stage 104, or the insertion of information segments from the second stage 104, to the third stage 106. Further, as described above, if an information segment is extracted from the second stage permanent register 206, an extraction operation is initiated with the second stage 104 and the third stage 106 cooperating. Thus, the results of an extraction can ripple through the series of stages as long as "holes" are created in the permanent registers.

FIGS. 4 through 26 illustrate examples of the information segment extraction operations mentioned above in the description of FIGS. 1 and 3. In these examples the information segments have a field known as a deadline. The earliest deadline, the smallest number in these examples, is considered to have the highest rank in the field of deadlines. In some aspects of the invention, the numbering system reaches a maximum value and wraps around (rolls over), however, for simplicity wrap around is ignored in these examples. These examples illustrate some of the basic principles mentioned above in the discussion of cooperating stages. The extraction principles can be summarized as follows:

1. Following an extraction, the empty first stage permanent register (a hole) must be filled, if there are information segments in any of the other registers in the first and second stages;
2. If an information segment in the first stage temporary register has not been moved to fill a "hole" in the first stage permanent register, it must move to a higher stage to make room for insertions from lower sequence stages;
3. Information segments in the second stage permanent register can only move to the first stage permanent register;
4. Information segments in the second stage temporary register can:
   a. fill the hole in the first stage permanent register;
   b. remain in place if there is no insertion from the first stage temporary register;
   c. be inserted into the third stage temporary register if there is insertion from the first stage temporary register; and
   d. remain in place if the information segments in the second stage registers have the same ranks (deadlines).

In FIG. 4, an information segment with a deadline of 15 has been extracted from the first stage permanent register. The extraction is indicated by the cross-hatched lines. Since 17 is the smallest number (earliest remaining deadline and highest priority), it is moved from the first stage temporary register to the first stage permanent register. The 20 in the second stage permanent register remains stationary. The 18 in the second stage temporary register remains stationary. This is an example of how an information segment extraction "ripple" dies.

FIG. 5, an information segment with a deadline of 15 has been extracted from the first stage permanent register. Since 17 is the smallest remaining deadline, it is moved from the second stage temporary register to the first stage permanent register. The 20 in the second stage permanent register remains stationary. The 18 in the first stage temporary register is inserted into the second stage temporary register.

In FIG. 6, an information segment with a deadline of 15 has been extracted from the first stage permanent register. Since 17 is the smallest remaining deadline, it is moved from the first stage temporary register to the first stage permanent register. The 20 in the second stage permanent register remains stationary. It is assumed herein that the lower numbered subscripts have priority (earlier arrival) over higher numbered subscripts. Subscripts shown ill the figures signify arrival order and are just for the purpose of illustration. In the algorithm, a "shift" operation is used to preserve the order of information segments having the same deadline, as mentioned above. The 20 in the second stage temporary register either remains stationary or is inserted into the third stage.

In FIG. 7, an information segment with a deadline of 15 has been extracted from the first stage permanent register. Since 17 is the smallest remaining deadline, it is moved from the second stage temporary register to the first stage permanent register. The 20 in the second stage permanent register remains stationary. The 20 in the first stage temporary register is inserted into the second stage temporary register.

In FIG. 8 an information segment with a deadline of 15 has been extracted from the first stage permanent register. The higher priority 20 is moved from the second stage permanent register to the first stage permanent register. The 21 in the first stage temporary register is inserted into the second stage, and the lower priority 20 in the second stage temporary register is inserted into the third stage.

In FIG. 9 an information segment with a deadline of 15 has been extracted from the first stage permanent register. The higher priority 20 is moved from the second stage permanent register to the first stage permanent register. The 21 in the second stage temporary register is inserted into the third stage, and the lower priority 20 in the first stage temporary register is inserted into the second stage.

In FIG. 10 an information segment with a deadline of 15 has been extracted from the first stage permanent register. The 20 is moved from the second stage permanent register to the first stage permanent register. The 21 in the first stage temporary register is inserted into the second stage temporary register, which is empty.

In FIG. 11 an information segment with a deadline of 15 has been extracted from the first stage permanent register. The 18 is moved from the first stage temporary register to the first stage permanent register. The 20 in the second stage permanent register remains stationary.

In FIG. 12 an information segment with a deadline of 15 has been extracted from the first stage permanent register. A 20 is moved from the second stage permanent register to the first stage permanent register. The 23 in the second stage temporary register either remains stationary or is inserted into the third stage.

In FIG. 13 an information segment with a deadline of 15 has been extracted from the first stage permanent register. The 18 is moved from the second stage temporary register to the first stage permanent register. The 20 in the second stage permanent register remains stationary.

In FIG. 14 an information segment with a deadline of 15 has been extracted from the first stage permanent register. The 18 is moved from the first stage temporary register to the first stage permanent register. The 20 in the second stage temporary register remains stationary.

In FIG. 15 an information segment with a deadline of 15 has been extracted from the first stage permanent register. The 18 is moved from the second stage temporary register to the first stage permanent register. The 20 in the first stage temporary register is inserted into the second stage.

In FIG. 16 an information segment with a deadline of 15 has been extracted from the first stage permanent register. The 20 is moved from the second stage permanent register to the first stage permanent register.

In FIG. 17 an information segment with a deadline of 15 has been extracted from the first stage permanent register. A 20 is moved from the first stage temporary register to the first stage permanent register.

In FIG. 18 an information segment with a deadline of 15 has been extracted from the first stage permanent register. A 20 is moved from the second stage temporary register to the first stage permanent register.

In FIG. 19 an information segment with a deadline of 15 has been extracted from the first stage permanent register. There are no information segments in any of the other first and second stage registers to fill the hole in the first stage permanent register.

In FIG. 20 an information segment with a deadline of 15 has been extracted from the first stage permanent register. A 20 with a higher priority than the 20 in the first stage temporary register is moved from the second stage temporary register to the first stage permanent register. The lower priority 20 is inserted into the second stage.

In FIG. 21 an information segment with a deadline of 15 has been extracted from the first stage permanent register. A 17 is moved from the first stage temporary register to the first stage permanent register. The 20 in the second stage permanent register remains stationary.

In FIG. 22 an information segment with a deadline of 15 has been extracted from the first stage permanent register. A 17 is moved from the first stage temporary register to the first stage permanent register. A 20 in the second stage temporary register remains stationary, as does the 20 in the second stage temporary register to preserve their ordering based on arrival time.

In FIG. 23 an information segment with a deadline of 15 has been extracted from the first stage permanent register. A 17 is moved from the second stage temporary register to the first stage permanent register. The 20 in the second stage permanent register remains stationary. The 18 in the first stage temporary register is inserted into the second stage.

In FIG. 24 an information segment with a deadline of 15 has been extracted from the first stage permanent register. A 20 with the highest priority is moved from the second stage temporary register to the first stage permanent register. The 20 with the intermediate priority in the second stage permanent register remains stationary. The 20 with the lowest priority is inserted from the first stage temporary register to the second stage.

In FIG. 25 an information segment with a deadline of 15 has been extracted from the first stage permanent register. A 20 is moved from the second stage temporary register to the first stage permanent register.

In FIG. 26 an information segment with a deadline of 15 has been extracted from the first stage permanent register. A 20 with a higher priority is moved from the second stage temporary register to the first stage permanent register. The 20 with the lower priority in the second stage permanent register remains stationary.

Figure 29:
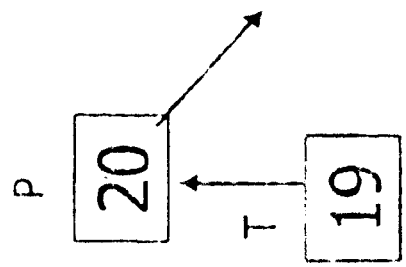
FIGS. 27 through 29 illustrate the movement of information segments through independent, or non-cooperating stages.
Figure 28:
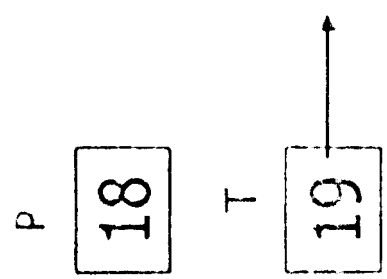
Figure 27:
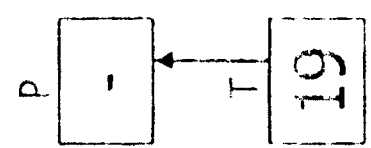

FIGS. 27 through 29 illustrate the movement of information segments through independent, or non-cooperating stages. In FIG. 27, an information segment having a deadline of 19 is inserted into the permanent register, which is empty. This is an example of how an information segment insertion "ripple" dies.

In FIG. 28, the information segment in the temporary register, with the larger (lower priority) deadline, is shifted into a higher sequence stage. In FIG. 29, the information segment in the temporary register, with the smaller deadline (19) is moved to the permanent register. The information segment with the larger deadline (20) in the permanent register is shifted into a higher sequence stage. The insertion operation continues, or ripples to the next stage.

Figure 30:
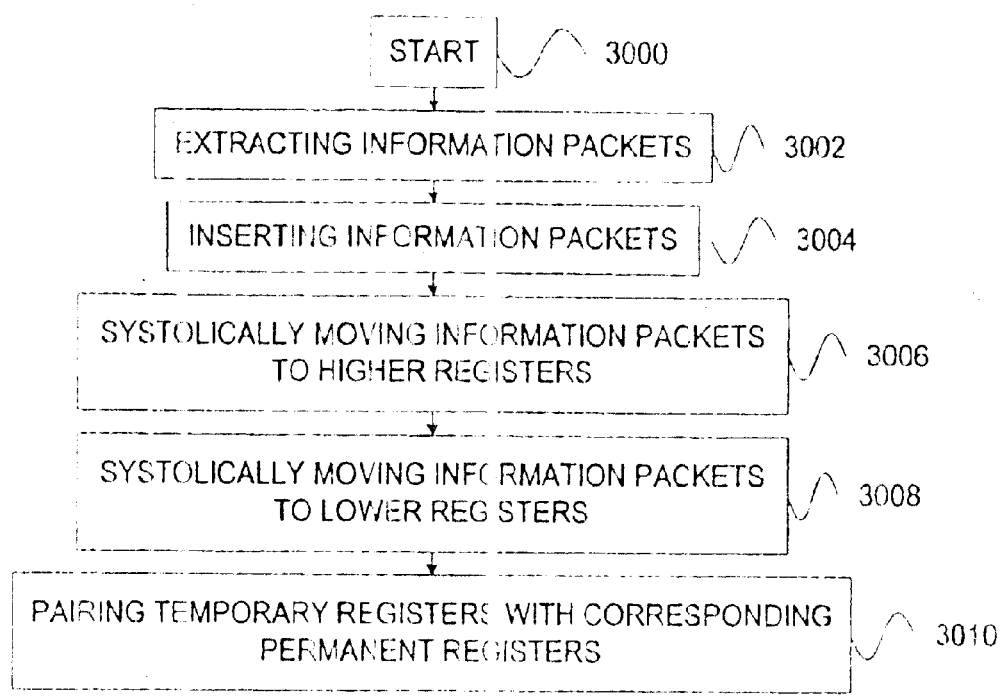
FIG. 30 is a flowchart depicting a method for sorting information segments by field rank in a earliest deadline first queue integrated circuit of a broadcast switch.

FIG. 30 is a flowchart depicting a method for sorting information segments by field rank in a earliest deadline first queue integrated circuit of a broadcast switch. Although the method is depicted as a sequence of numbered steps for clarity, no order should be inferred from the numbering unless explicitly stated. The method begins with Step 3000. Step 3002 extracts information segments, having a field with a sequential rank, by field rank, at a maximum extraction rate. Step 3004 inserts the information segments, at a maximum insertion rate equal to twice the maximum extraction rate. In some aspects of the invention, inserting information segments in Step 3002 includes inserting information segments into a temporary register.

Step 3006 systolically moves information segments with lower field ranks to registers higher in a sequenced order of registers. Step 3008 systolically moves information segments with higher field ranks to registers lower in a sequenced order of registers. Step 3010 pairs temporary registers with corresponding permanent registers having the same order in a sequence of neighboring registers, forming stages in a sequenced order of stages.

Figure 31:
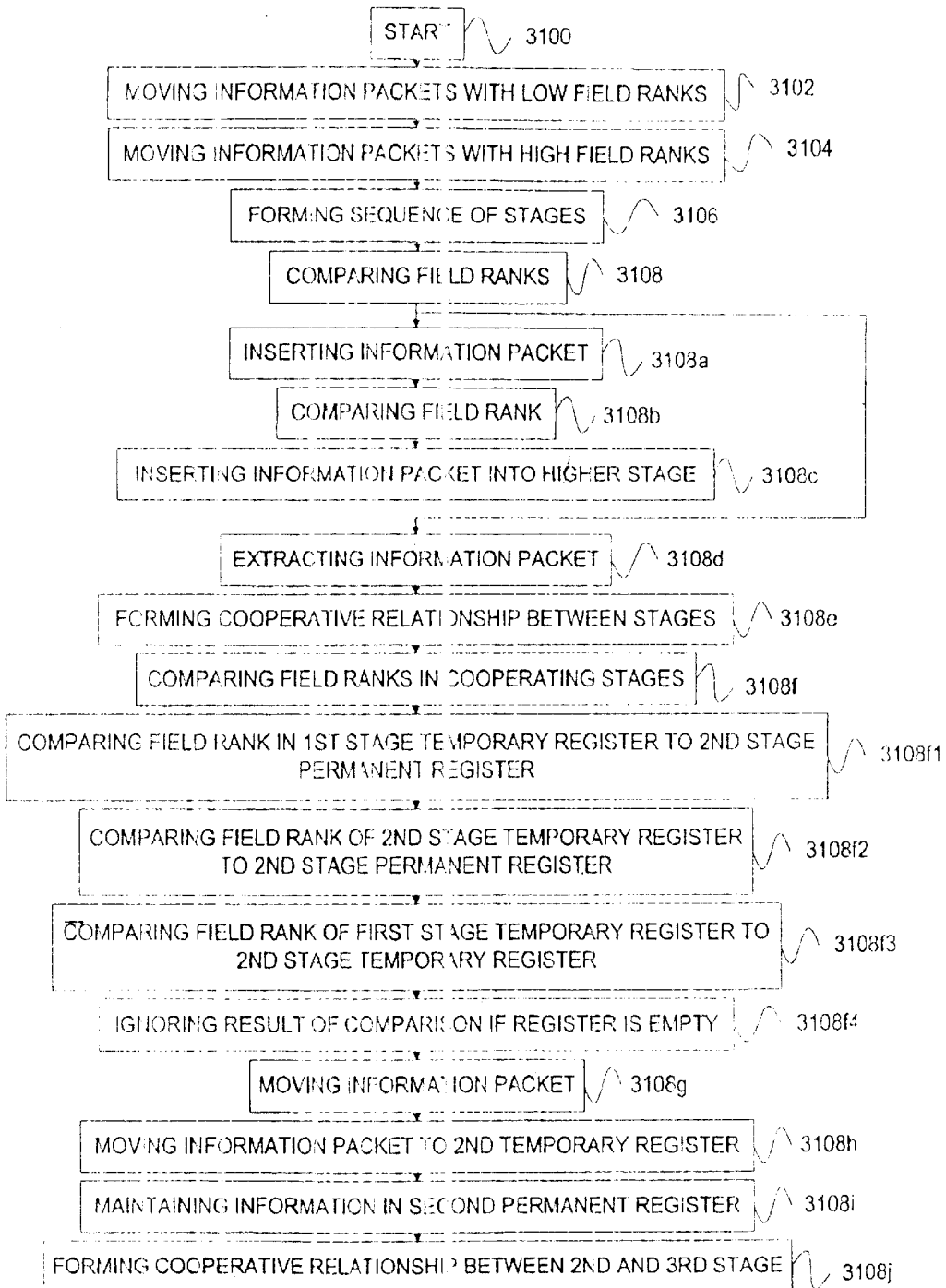
FIG. 31 is a flowchart depicting additional details of the method of FIG. 30.

FIG. 31 is a flowchart depicting additional details of the method of FIG. 30. The method begins with Step 3100. Step 3102 systolically moves information segments with lower field ranks to temporary registers higher in a sequenced order of temporary registers. Step 3104 systolically moves information segments with higher field ranks to permanent registers lower in a sequenced order of permanent registers. Step 3106 pairs each temporary register with a corresponding permanent register having the same order in a sequence of neighboring registers, forming stages in a sequenced order of stages.

Step 3108 compares the field ranks of information segments in neighboring registers. Systolically moving information segments in Steps 3102 and 3104 includes moving information segments between neighboring registers in response to the field rank comparisons.

Step 3108*a* inserts an information segment into a temporary register in a first stage. Step 3108*b* compares the field rank of the information segment in the temporary register to the field rank of an information segment in the first stage permanent register. Step 3108*c* inserts the information segment having the lower rank into the temporary register of a second stage, higher in order than the first stage. Moving information segments between neighboring registers in Steps 3102 and 3104 includes moving the information segment having the higher rank into the first stage permanent register.

Step 3108*d* extracts an information segment with the highest field rank from each stage. In some aspects of the application, comparing the field ranks of information segments in neighboring registers in Step 3108 includes comparing the field ranks of information segments in consecutive stages of the sequenced order of stages.

Step 3108*e*, following the extraction of an information segment from a register in a first stage, forms a cooperative relationship between the first stage and a second stage, higher in sequence then the first stage. Step 3108*f* compares the field ranks of information segments in the cooperating first and second stages. Step 3108*g* moves the information segment with the highest ranking to the permanent register in the first stage following the comparison.

In some aspects of the invention, comparing the field ranks of information segments in the cooperating stages in Step 3108*f* includes sub-steps. Step 3108*f*1 compares the field rank of the information segment in the temporary register of the first stage to the information segment in the permanent register of the second stage. Step 3108*f*2 simultaneously compares the field rank of the information segment in the temporary register of the second stage to the information segment in the permanent register of the second stage. Step 3108*f*3 simultaneously compares the field rank of the information segment in the temporary register of the first stage to the information segment in the temporary register of the second stage. Step 3108*f*4 ignores the result of a simultaneous comparison of information segments in neighboring registers if one (or more) of the registers is empty.

Step 3108*h* moves the information segment to the second temporary register if the information segment in the first temporary register is not moved into the first permanent register. Step 3108*i* maintains the information in the second permanent register if the information segment in the second permanent register is not moved into the first permanent register. Step 3108*j* forms a cooperative relationship between the second stage and a third stage, higher in sequence then the second stage if the information in the second permanent register is moved into the first permanent register.

In some aspects of the invention, comparing the field ranks of information segments in neighboring registers in Step 3108 includes selecting the first inserted information segment if the information segments have the same field rank. Technically, moving an information segment from a lower stage permanent register to a higher stage temporary register does not require a comparison. Such a move is called a "shift" and not an insert. An "insert" requires comparisons to determine which information segment is earlier (has higher rank), whereas a "shift" does not require any comparison. Previously compared and ordered information segments are moved with a shift operation. Thus, if the information segments in the first stage are received with a shift command and the information segments have the same rank, the information segment in the permanent register is shifted to the temporary register of the second stage, and the information segment in the first stage temporary register is shifted to the first stage permanent register.

In some aspects, inserting an information segment in Step 3108a includes inserting information segments at a maximum insertion rate. In some aspects of the invention, extracting an information segment in Step 3108d includes extracting the information segments at a maximum extraction rate, where the maximum insertion rate is twice the maximum extraction rate.

Figure 32:
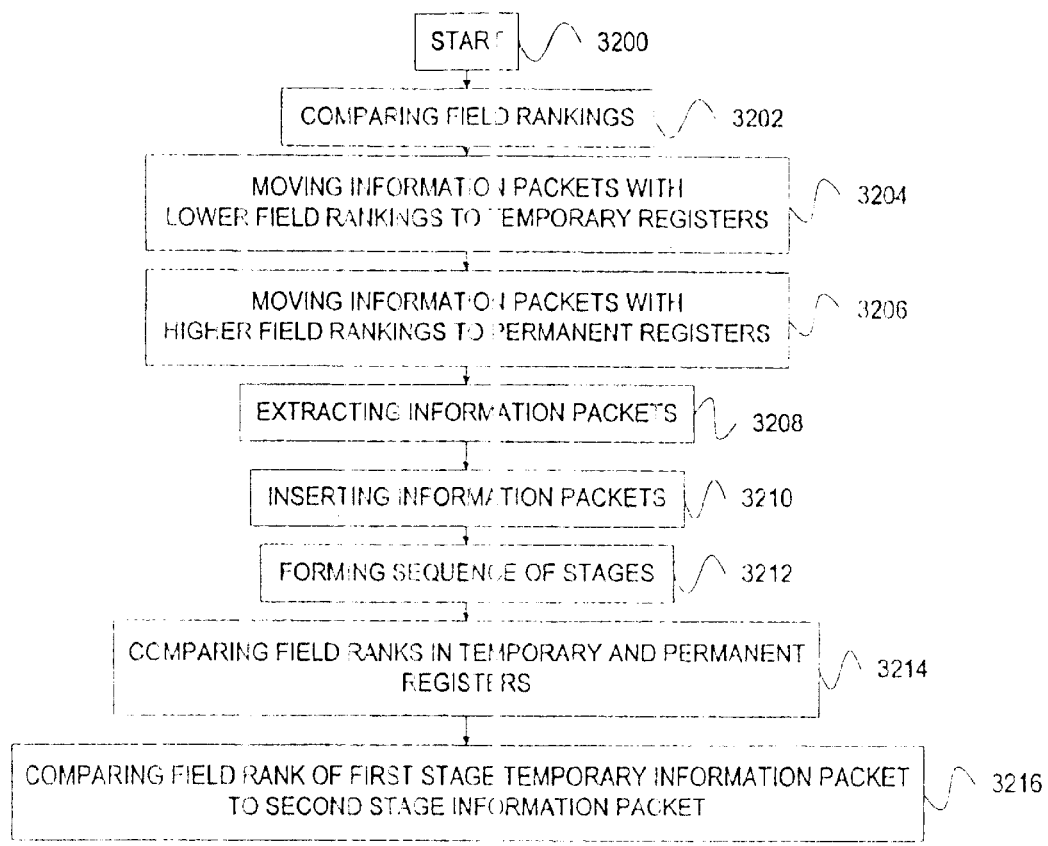
FIG. 32 is a flowchart depicting an alternate method for sorting information segments in a switching buffer circuit.

FIG. 32 is a flowchart depicting an alternate method for sorting information segments in a switching network buffer circuit. The method begins with Step 3200. Step 3202 compares the field rankings of information segments in neighboring registers. Step 3204 in response to comparing, systolically moves information segments with lower field rankings to temporary registers higher in sequence. Step 3206 in response to comparing, systolically moves information segments with higher rankings to permanent registers lower in sequence. Step 3208 extracts information segments at a maximum first rate. Step 3210 inserts information segments at a maximum second rate, twice the first rate.

Step 3212 pairs each temporary register to a permanent register having the same order in a sequence of registers, forming a sequence of stages. Step 3214 compares the field ranks of the information segments in the temporary and permanent registers of the first stage in response to inserting an information segment into a temporary register in a first stage. Step 3216 in response to extracting an information segment from a permanent register in a first stage, compares the field ranks of an information segment in the first stage temporary to information segments in a second stage, higher in sequence than the first stage. Information segments having the same field rank are shifted. The shifting operation is described in detail above.

A system and method have been provided for sorting information segments in a packet/cell output buffer switch. The invention is immediately applicable to synchronous optical network (SONET) communications. However, the invention also has use in to any system that organizes, stores, and retrieves information. Other variations and embodiments of the invention will occur to those skilled in the art.

I claim:

1. In a broadband earliest deadline first (EDF) queue integrated circuit, a method for sorting information by field rank, the method comprising:

extracting information segments having a field with a sequential rank, by field rank, at a maximum extraction rate; and inserting information segments, at a maximum insertion rate equal to twice the maximum extraction rate.

2. The method of claim 1 wherein inserting information segments includes inserting information segments into a temporary register.

3. The method of claim 2 further comprising:

systolically moving information segments with lower field ranks to registers higher in a sequenced order of registers.

4. The method of claim 3 further comprising:

systolically moving information segments with higher field ranks to registers lower in a sequenced order of registers.

5. The method of claim 4 further comprising:

pairing temporary registers with corresponding permanent registers having the same order in a sequence of neighboring registers, forming stages in a sequenced order of stages.

6. In a broadband earliest deadline first (EDF) queue, a method for sorting information segments by field rank, the method comprising:

systolically moving information segments with lower field ranks to temporary registers higher in a sequenced order of temporary registers;

systolically moving information segments with higher field ranks to permanent registers lower in a sequenced order of permanent registers; and pairing each temporary register with a corresponding permanent register having the same order in a sequence of neighboring registers, forming stages in a sequenced order of stages.

7. The method of claim 6 further comprising:

comparing the field ranks of information segments in neighboring registers; and wherein systolically moving information segments includes moving information segments between neighboring registers in response to the field rank comparisons.

8. The method of claim 7 further comprising:

inserting an information segment into a temporary register in a first stage;

comparing the field rank of the information segment in the temporary register to the field rank of an information segment in a first stage permanent register;

inserting the information segment having the lower rank into the temporary register of a second stage, higher in order than the first stage; and wherein moving information segments between neighboring registers includes moving the information segment having the higher rank into the first stage permanent register.

9. The method of claim 8 further comprising:

extracting an information segment with the highest field rank from each stage.

10. The method of claim 9 wherein comparing the field ranks of information segments in neighboring registers includes comparing the field ranks of information segments in consecutive stages of the sequenced order of stages.

11. The method of 10 further comprising:

following the extraction of an information segment from a register in a first stage, forming a cooperative relationship between the first stage and a second stage, higher in sequence then the first stage.

12. The method of claim 11 further comprising:

comparing the field ranks of information segments in the cooperating first and second stages; and following the comparison, moving the information segment with the highest ranking to the permanent register in the first stage.

13. The method of claim 12 wherein comparing the field ranks of information segments in the cooperating stages includes:

comparing the field rank of the information segment in the temporary register of the first stage to the information segment in the permanent register of the second stage;

simultaneously comparing the field rank of the information segment in the temporary register of the second stage to the information segment in the permanent register of the second stage; and simultaneously comparing the field rank of the information segment in the temporary register of the first stage to the information segment in the temporary register of the second stage.

14. The method of claim 13 further comprising:

ignoring the result of a simultaneous comparison of information segments in neighboring registers if one of the registers is empty.

15. The method of claim 13 further comprising:

if the in formation segment in the first stage temporary register is not moved into the first stage permanent register, moving the information segment to the second stage temporary register.

16. The method of claim 13 further comprising:

if the information segment in the second stage permanent register is not moved into the first stage permanent register, maintaining the information in the second stage permanent register.

17. The method of claim 13 further comprising:

if the information in the second stage permanent register is moved into the first stage permanent register, forming a cooperative relationship between the second stage and a third stage, higher in sequence then the second stage.

18. The method of claim 7 wherein comparing of the field ranks of information segments in neighboring registers include selecting the first inserted information segment if the information segments have the same field rank.

19. The method of claim 9 wherein inserting an information segment includes inserting information segments at a maximum insertion rate.

20. The method of claim 19 wherein extracting an information segment includes extracting the information segments at a maximum insertion rate equal to twice the maximum extraction rate.

21. In an earliest deadline first (EDF) queue, a method for sorting information segments, the method comprising:

comparing the field rankings of information segments in neighboring registers;

in response to comparing, systolically moving information segments with lower field rankings to temporary registers higher in sequence; and in response to comparing, systolically moving information segments with higher rankings to permanent registers lower in sequence.

22. The method of claim 21 further comprising:

extracting information segments at a maximum first rate; and inserting information segments at a maximum second rate, twice the first rate.

23. The method of claim 22 further comprising:

pairing each temporary register to a permanent register having the same order in a sequence of registers, forming a sequence of stages;

in response to inserting an information segment into a temporary register in a first stage, comparing the field ranks of the information segments in the temporary and permanent registers of the first stage.

24. The method of 23 further comprising:

in response to extracting an information segment from a permanent register in a first stage, comparing the field ranks of an information segment in the first stage temporary to information segments in a second stage, higher in sequence than the first stage.

25. The method of claim 21 further comprising:

shifting information segments having the same field ranks.

26. In an earliest deadline first queue integrated circuit, a system for sorting information segments by field rank, the system comprising:

a sequence of stages for storing information segments having a field of sequential ranks;

wherein each stage has a port for accepting information segment insertions from a lower sequence stage, a port for supplying extracted information segments to a lower sequence stage, a port for accepting information segment extractions from a higher sequence stage, and a port for supplying information segment insertions into a higher sequence stage; and wherein each stage accepts information segments inserted at a maximum insertion rate, and supplies information segments extracted in response to the field rank of the information segment, at a maximum extraction rate, where the maximum insertion rate is equal to twice the maximum extraction rate.

27. The system of claim 26 wherein each stage includes a temporary register having an input and an output, and a permanent register having an input and an output; and wherein a lower sequence stage inserts information segments into the temporary register of a higher sequence stage.

28. The system of claim 27 wherein a permanent register in a lower sequence stage receives information segments extracted from a higher sequence stage.

29. The system of claim 28 wherein each stage further includes:

a first comparator having a first input connected to the temporary register output, a second input connected to the output of the permanent register, and an output to supply the results of a comparison of information segment field ranks;

a second comparator having a first input connected to the temporary register output, a second input connected to the output of a permanent register in a higher sequence stage, and an output to supply the results of a comparison of information segment field ranks; and a third comparator having a first input connected to the temporary register output, a second input connected to the output of a temporary register in a higher sequence stage, and an output to supply the results of a comparison of information segment field ranks.

30. The system of claim 29 wherein each stage further includes:

a first multiplexor (MUX) having a first input connected to the output of the permanent register in the higher sequence stage, a second input connected to the temporary register in the higher sequence stage, a third input connected to the output of the temporary register in the same stage, a fourth input connected to the output of the permanent register in the same stage, an output connected to the input of the permanent register in the same stage, and a control input to accept MUX selection commands.

31. The system of claim 30 wherein each stage further includes:

a second MUX having a first input connected to the output of the permanent register in the same stage, a second input connected to the output of the temporary register in the same stage, an output connected to the input of the higher sequence stage temporary register input, and a control input to accept MUX selection commands.

32. In a earliest deadline first queue integrated circuit, a system for sorting information segments by field rank, the system comprising:

a sequence of stages for storing information segments having a field of sequential ranks;

wherein each stage includes a temporary register having an input and an output, a permanent register having an input and an output, a port for accepting information segment insertions from a lower sequence stage, ports for supplying extracted information segments to a lower sequence stage, a port for accepting information segment extractions from a higher sequence stage, and a port for supplying information segment insertions into a higher sequence stage;

wherein each stage accepts information segments inserted into the temporary register from a lower sequence stage at a maximum insertion rate, and accepts information segments into the permanent register extracted from a higher sequence stage, in response to the field rank of the information segment, at a maximum extraction rate equal to one-half the maximum insertion rate;

wherein each stage includes a first comparator having a first input connected to the temporary register output, a second input connected to the output of the permanent register, and an output to supply the results of a comparison of information segment field ranks;

wherein each stage includes a second comparator having a first input connected to the temporary register output, a second input connected to the output of a permanent register in a higher sequence stage, and an output to supply the results of a comparison of information segment field ranks;

wherein each stage includes a third comparator having a first input connected to the temporary register output, a second input connected to the output of a temporary register in a higher sequence stage, and an output to supply the results of a comparison of information segment field ranks;

wherein each stage includes a first multiplexor (MUX) having a first input connected to the output of the permanent register in the higher sequence stage, a second input connected to the temporary register in the higher sequence stage, a third input connected to the output of the temporary register in the same stage, a fourth input connected to the output of the permanent register in the same stage, an output connected to the input of the permanent register in the same stage, and a control input to accept MUX selection commands;

wherein each stage includes a second MUX having a first input connected to the output of the permanent register in the same stage, a second input connected to the output of the temporary register in the same stage, an output connected to the input of the higher sequence stage temporary register input, and a control input to accept MUX selection commands; and wherein each stage includes a controller having a first input connected to the output of the first comparator, a second input connected to the output of the second comparator, a third input connected to the output of the third comparator, a fourth input to connected to the output of a second comparator in a lower sequence stage, a fifth input connected to the output of a third comparator in a lower sequence stage, a sixth input connected to the output of a first comparator in a higher sequence stage, a seventh input to accept insertion and extraction commands from a controller in a lower sequence stage, a first output connected to the control input of the first MUX, a second output connected to the control input of the second MUX, and a third output connected to the seventh input of a controller in a higher sequence stage.

33. The system of claim 32 wherein the controllers in the sequence of stages interact to systolically move information segments with lower field ranks from stages lower in a sequence, to stages higher in sequence.

34. The system of claim 33 wherein the controllers in the sequence of stages cooperate as a team to systolically move information segments with higher field ranks, from higher sequence stages, to lower sequence stages.

35. The system of claim 33 wherein each controller has an eighth input connected to the seventh input of a controller in a lower sequence stage to further cooperation between the controllers.

36. The system of claim 35 wherein an information segment is inserted into a temporary register in a first stage;

wherein the first comparator compares the ranks of the information segment inserted into the temporary register and the information segment in the permanent register, and supplies the results of the comparison to the controller;

wherein the controller directs the first MUX to supply the information segment with the higher rank to the permanent register; and wherein the controller directs the second MUX to supply the information segment with the lower rank to a temporary register of a second stage, higher in sequence than the first stage.

37. The system of claim 36 wherein an information segment is extracted from the first stage permanent register;

wherein the first stage second comparator compares the rank of the information segment in the first stage temporary register to an information segment in the second stage permanent register;

wherein the first stage third comparator compares the rank of the information segment in the first stage temporary register to the information segment in a second stage temporary register; and wherein the second stage first comparator compares the rank of the information segment in the second stage temporary register to the information segment in the second stage permanent register.

38. The system of claim 37 wherein the controller disregards the output of a comparator, if that comparator is comparing a register having no information segment.

39. The system of claim 37 wherein the first stage controller sends a message to the second stage controller communicating the extraction operation;

wherein the first stage controller directs the first stage first MUX to deliver the highest ranking information segment to the first stage permanent register; and wherein, if the first stage temporary register information segment is not the highest ranked, the first stage controller directs the first stage second MUX to insert that information segment into the second stage temporary register.

40. The system of claim 37 wherein, if the second stage permanent register information segment is not the highest ranked, the first stage controller maintains that information segment in the second stage permanent register.

41. The system of claim 37 wherein, if the second stage permanent register information segment is extracted and moved to the first stage permanent register, the second stage second comparator compares the rank of the information segment in the second stage temporary register to an information segment in a third stage permanent register, where the third stage is higher in sequence than the second stage;

wherein the second stage third comparator compares the rank of the information segment in the second stage temporary register to the information segment in a third stage temporary register; and wherein the third stage first comparator compares the rank of the information segment in the third stage temporary register to the information segment in the third stage permanent register.

42. The system of claim 37 wherein the first stage controller sends a message to the second stage controller communicating the insertion operation;

wherein the first stage controller directs the first stage second MUX to deliver an information segment for insertion into the second stage temporary register.

43. The system of claim 32 wherein the temporary register of a first stage receives a shift command from a stage lower in the sequence of stages, and an information segment having the same rank as the information segment in the first stage permanent register; and wherein the information segment in the first stage permanent register is shifted to a temporary register in a second stage, higher in the sequence of stages than the first stage.

* * * * *